United States Patent [19]

Seita et al.

[11] 4,154,909

[45] May 15, 1979

[54] PROCESS FOR PRODUCING CATION EXCHANGE MEMBRANE BY TREATMENT OF FLUORINATED POLYMER CONTAINING SULFONYL HALIDE GROUPS WITH AMINE AND VINYL MONOMER

[75] Inventors: Toru Seita; Kenji Takahashi; Shunichi Asami; Akihiko Shimizu, all of Shin-nanyo, Japan

[73] Assignee: Toyo Soda Manufacturing Co., Ltd., Yamaguchi, Japan

[21] Appl. No.: 929,499

[22] Filed: Jul. 31, 1978

[30] Foreign Application Priority Data

Sep. 13, 1977 [JP] Japan .................................. 52-109449

[51] Int. Cl.$^2$ ........................... C25B 1/46; C08F 8/30
[52] U.S. Cl. ........................................ 521/32; 260/884; 528/205; 204/159.15; 521/27
[58] Field of Search .................................. 521/27, 32

[56] References Cited

U.S. PATENT DOCUMENTS

| 3,257,334 | 6/1966 | Chen et al. ............................. 521/32 |
| 3,647,086 | 3/1972 | Mizatoni et al. ....................... 521/32 |
| 3,969,285 | 7/1976 | Grot ....................................... 521/32 |

FOREIGN PATENT DOCUMENTS

| 66488 | 6/1975 | Japan. |
| 92339 | 7/1975 | Japan. |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A cation exchange membrane is produced by treating a membrane of a fluorinated polymer having sulfonyl halide group on side chains with a mixture of ①a reaction product of an amine with a halogenated monomer and ②a vinyl monomer and/or diene monomer each of which has carboxylic acid group, phenolic hydroxyl group, sulfonic acid group and/or a functional group being convertible into carboxylic acid group, phenolic hydroxyl group or sulfonic acid group.

7 Claims, No Drawings

PROCESS FOR PRODUCING CATION EXCHANGE MEMBRANE BY TREATMENT OF FLUORINATED POLYMER CONTAINING SULFONYL HALIDE GROUPS WITH AMINE AND VINYL MONOMER

BACKGROUND OF THE INVENTION

The present invention relates to a cation exchange membrane having excellent electrochemical characteristic, cation selective permeability, chemical resistance, heat resistance and mechanical resistance and a process for producing the same. More particularly, it relates to a cation exchange membrane suitable for an electrolysis of an alkali metal halide and a process for producing the same.

Many studies for improving ion selective permeability and durability of a cation exchange membrane have been made. As the result, cation exchange membranes of styrene-divinyl benzene type crosslinked polymer having sulfonic acid groups or modifier thereof have been developed to be commercially available cation exchange membranes having satisfactory selective permeability and durability.

However, the cation exchange membranes have been required to use under severe conditions as found in the treatments of drainage and waste water or the electrolysis of sodium chloride whereby further improvement of the membranes has been required.

The selective permeability has not been always satisfactory.

The conventional cation exchange membranes have suitable permeation inhibiting property to most of anions, however they have disadvantage of low cation transport number in the case of an aqueous solution of an electrolyte forming hydroxyl ions in comparison with the other case.

It has been proposed to use cation exchange membrane of fluorinated resin having sulfonic acid groups as the functional groups in order to overcome the disadvantages.

The typical cation exchange membranes include perfluorosulfonic acid type membranes (commerciallized from E. I. DuPont: Trade name: Nafion Membrane -110, -120, 315 and -390). These membranes have improved durability, however, they do not have satisfactory cation transport number in an aqueous solution of an electrolyte forming hydroxyl ions.

In order to improve the membrane, it has been proposed to provide a method of converting only one surface of the membrane to have —SO₂NHZ groups (wherein Z represents hydrogen atom, —NH₄, a cation of alkali metal or alkaline earth metal) as disclosed in Japanese Unexamined Patent Publication No. 44360/1973; a method of forming a neutral layer on one surface as disclosed in Japanese Unexamined Patent Publication No. 108182/1975, and a method of increasing EW (weight of resin having one equivalent of exchange groups) on one surface than EW of the inner layer as disclosed in Japanese Unexamined Patent Publication No. 87183/1976.

However, when the conventional membrane made of the fluorinated polymer having sulfonic acid groups is used as a cation exchange membrane, there is no cross-linkage of chemical bond in the membrane, whereby various troubles are found. In order to overcome the disadvantages, it has been proposed to provide a method of forming partially crosslinkage by reacting a diamine or a polyamine with sulfonyl fluoride groups on at least one surface of the membrane to form sulfonamide as disclosed in Japanese Unexamined Patent Publication No. 92339/1975. Certain disadvantages have been overcome by the method, however, the cross-linked structure is not perfect and the current efficiency has not been satisfactorily improved in an economical use.

SUMMARY OF THE INVENTION

It is an object of the present invention to provide a process for producing a cation exchange membrane having high selective permeability and durability.

The foregoing and other objects of the present invention have been attained by providing a process for producing a cation exchange membrane which comprises treating a membrane of a fluorinated polymer having sulfonyl halide groups on side chains with a specific mixture of ① a reaction product of an amine with a halogenated monomer and ② a vinyl monomer and/or a diene monomer each of which has carboxylic acid group, phenolic hydroxyl group, sulfonic acid group and/or a functional group being convertible into carboxylic acid group, phenolic hydroxyl group or sulfonic acid group, by impregnating or coating the mixture on the membrane and reacting the amino group of the reaction product with the sulfonyl halide group of the membrane and performing a polymerization and converting the functional groups into carboxylic acid groups, phenolic hydroxyl groups and/or sulfonic acid groups in the case of the functional group.

DETAILED DESCRIPTION OF THE PREFERRED EMBODIMENTS

The specific mixture (hereinafter referring to as the treating mixture) includes ① a reaction product obtained by reacting an amine having at least one of primary amino groups with a halogenated monomer under controlling so as to remain at least one primary amino group or secondary amino group, and ② a vinyl monomer and/or a diene monomer each of which has a carboxylic acid group, phenolic hydroxyl group, sulfonic acid group and/or a functional group being convertible into carboxylic acid group, phenolic hydroxyl group or sulfonic acid group and optionally a crosslinking agent, a radical initiator or a sensitizer.

The membrane is impregnated with the treating mixture or the treating mixture is coated on the membrane of a fluorinated polymer having sulfonyl halide groups to react the amino group of the treating mixture with the sulfonyl halide groups of the membrane and then, the monomers are polymerized.

When the vinyl monomer and/or the diene monomer each of which has the functional group are used, the functional groups of the polymerized product are converted into carboxylic acid group, phenolic hydroxyl group and/or sulfonic acid group.

In the process of the present invention, the reaction of the primary amino group or secondary amino group with the sulfonyl halide groups of the membrane is carried out to form sulfonamide so as to bond the treating mixture with the substrate of the membrane and then, the polymerization is carried out to form a cross-linkage structure in the membrane by the vinyl monomer and/or the diene monomer with the unsaturated groups introduced by the reaction of the amine with the halogenated monomer and optionally with the cross-linking agent.

The cation exchange membrane obtained by the process of the present invention has the crosslinkage structure in the membrane and does not have a disadvantage of a phase separation caused in the case of the polymerization of a vinyl monomer or a crosslinking agent under a direct impregnation. Accordingly, a stable electrolysis in high current efficiency can be attained by using the cation exchange membrane.

In the characteristic of the present invention, the vinyl monomer and/or the diene monomer each of which has carboxylic acid group, phenolic hydroxyl group, sulfonic acid group and/or the functional group is included in the treating mixture whereby the introduction of these desirable groups can be controlled as desired and the electrochemical characteristic of the membrane can be given as desired without deteriorating it for the crosslinkage.

Suitable fluorinated polymers having sulfonyl halide groups include the polymers having the following units.

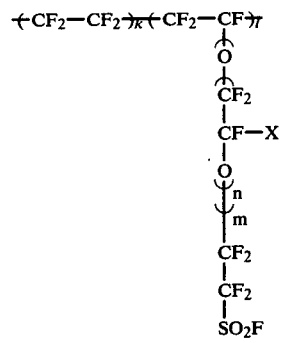

$X = -F, -CF_3, -CF_2-O-CF_3$;
$n = 0$ or $1 \sim 5$;
$m = 0$ or $1$;
$k/l = 3-16$ preferable $5-13$
especially, (1) 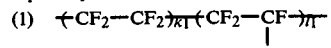
$CF_2-CF-O-CF_2-CF_2-SO_2F$ (2) 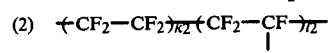
$CF_2-CF_2-SO_2F$ (3) $+CF_2-CF_2+_{k3}+CF_2-CF+_{l3}$
$\quad \quad O$
$\quad \quad |$
$\quad \quad CF_2-CF_2-SO_2F$ (4) 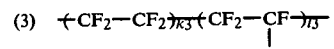
$CF_2-CF_2-SO_2F$ (5) 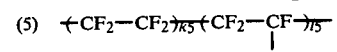
$CF_2-SO_2F$ It is preferable to use the copolymer having 700 to 2800 g of a weight of the resin per 1 equivalent of sulfonyl halide group (hereinafter referring to as EW=700 to 2800 etc.), preferably EW=1000 to 1500.

The optimum copolymers have the units having the formula (1).

It is also possible to use a membrane prepared by fabricating the copolymer having the structure to form a membrane and reinforcing the membrane with a polytetrafluoroethylene fabric etc. in order to improve the mechanical property.

It is also possible to use a membrane modifying sulfonyl fluoride groups of the fabricated membrane to sulfonyl chloride groups through a hydrolysis etc. to convert $-SO_2F$ into $-SO_3M$ wherein M is hydrogen or an alkali metal.

The reaction product in the treating mixture is produced by reacting the amine with the halogenated monomer in the presence of a tertiary amine or a base. The amine should have at least one primary amino group.

Suitable amines include monoamines such as ethylamine and propylamine; diamines such as ethylenediamine, 1,2-diaminopropane, and 1,3-diaminopropane; and polyamines such as triethylenetetramine and tetraethylenepentamine.

Suitable halogenated monomers include styrene derivatives such as chlorostyrene, bromostyrene, iodostyrene, chloromethylstyrene, bromomethylstyrene and iodomethylstyrene; and allyl derivatives such as allyl chloride, allyl bromide and allyl iodide.

Any other halogenated monomer which is reactive to an amino group can be used.

It is necessary to control the reaction so as to remain at least one primary or secondary amino group.

It is possible to use an inert solvent which is inert to sulfonyl halide group, depending upon the reaction. Suitable solvents include pyridine, benzene, carbon tetrachloride and dimethylformamide.

The reaction product is mixed with the vinyl monomer and/or the diene monomer each of which has carboxylic acid group, phenolic hydroxyl group, sulfonic acid group and/or a functional group being convertible into carboxylic acid group, phenolic hydroxyl group or sulfonic acid group.

Suitable vinyl monomers include

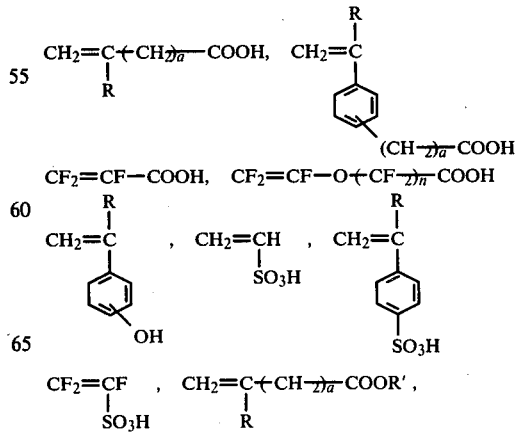

-continued

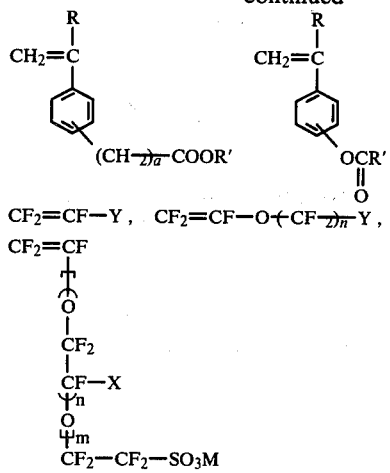

$CF_2=CF-Y$, $CF_2=CF-O+CF_{2\overline{n}}-Y$, $$CF_2=CF\!-\!\underset{\underset{\underset{\underset{CF_2-CF_2-SO_3M}{\psi m}}{O}}{\underset{\psi n}{CF-X}}}{\underset{CF_2}{O}}$$

wherein R represents hydrogen atom, and methyl group; a represent 0 or 1 to 3; n represents 1 to 3 R' represents a $C_1$-$C_5$ alkyl group; Y represents CN, COOR" or CONHR"; R" represents a $C_1$-$C_3$ alkyl group X represents F, $CF_3$, $CF_2$—O—$CF_3$ and m represents 0 or 1 M represents alkali metal such as Na, K, Li or H.

Suitable diene monomers include

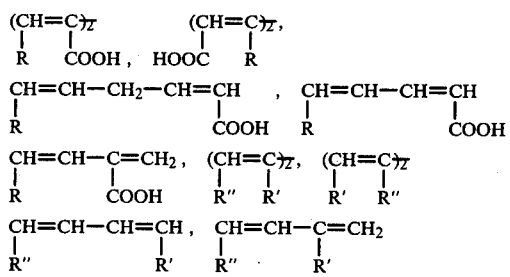

wherein R represents hydrogen atom, carboxylic acid group or a $C_1$-$C_5$ alkyl groups; R' represents CN, COOR''' or CONHR'''; R" represents hydrogen or halogen atom or a $C_1$-$C_5$ alkyl group; and R''' represents a $C_1$-$C_5$ alkyl group.

The vinyl monomer and diene monomer which have sulfonyl halide group or acid halide group being reactive to the amino group can not be used.

Suitable crosslinking agents include diene derivatives such as divinyl benzene, butadiene, and 1-chlorobutadiene.

The membrane of the fluorinated polymer having a sulfonyl halide groups is treated with the treating mixture by impregnating the mixture into the membrane or coating the mixture on one surface of the membrane to react the amino groups of the reaction product in the treating mixture with the sulfonyl halide groups of the membrane and then the polymerization is performed.

The reaction temperature in the reaction of the sulfonyl halide groups with the amino groups is in a range of 5° to 50° C. and can be upto about 200° C. if desirable.

The reaction time is usually in a range of 1 minute to 30 hours.

After the above-mentioned reaction, the unsaturated groups are polymerized to form the crosslinkages. The polymerization can be carried out by a thermal polymerization, a photopolymerization, a radical polymerization or a high energy radiation-induced polymerization with ionized radiation, electron rays etc.

The polymerization can be performed during the reaction of the sulfonyl halide groups with the amino groups.

When the vinyl monomer and/or the diene monomer each of which has a functional group being convertible into carboxylic acid group, phenolic hydroxyl group or sulfonic acid group is used in the treating mixture, it is necessary to convert the functional group into carboxylic acid group, phenolic hydroxyl group or sulfonic acid group.

The membrane resistance was an electric resistance measured by the AC bridge method (1000 c/s) at 25° C. in 2% aqueous solution of sodium hydroxide.

The invention will be further illustrated by certain examples which are provided for purposes of illustration only and are not intended to be limiting in any manner.

EXAMPLE 1

A membrane was prepared by copolymerizing $CF_2=CF_2$ with

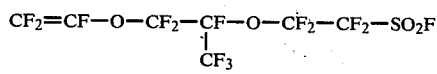

to give EW=1100 and fabricating the copolymer.

A treating mixture was prepared by reacting 1 mole of ethylene diamine with 0.5 mole of p-chloromethyl styrene in the presence of pyridene to obtain a reaction product and admixing 10 wt. parts of the reaction product with 4 wt. parts of acrylic acid, 2 wt. parts of divinyl benzene and 0.05 wt. parts of benzoyl peroxide.

The treating mixture was impregnated only one surface of the membrane at the room temperature for 3 hours and it was held between a pair of glass plates and the polymerization was performed at 90° C. for 15 hours.

After the polymerization, the membrane was hydrolyzed in 2.5 N-NaOH/methanol solution (ratio of 1:1 by weight) at 65° C. for 15 hours.

An electrolytic cell having effective area of 100 cm² was prepared by arranging in the order of an anode, an anode compartment, the cation exchange membrane (the treated surface was faced to the cathode side), a cathode compartment and a cathode. An electrolysis of an aqueous solution of sodium chloride was carried out by feeding a saturated solution of sodium chloride into the anode compartment and passing current at a current density of 30A/dm² and feeding continuously water into the cathode compartment so as to maintain 30 wt.% of the concentration of sodium hydroxide in the cathode compartment. The current efficiency to the resulting sodium hydroxide was 87%.

On the other hand, when a membrane treated with only ethylenediamine was used as a cation exchange membrane, the current efficiency of the membrane was 80%.

The electric resistance of the cation exchange membrane of the present invention was 5.8 Ω cm² whereas the electric resistance of the membrane treated with only ethylenediamine was 6.3 Ω cm².

EXAMPLE 2

In accordance with the process of Example 1 except using p-acetoxystyrene instead of acrylic acid, the impregnation, the reaction and the polymerization were carried out and then, p-acetoxy groups in the membrane were converted into phenolic hydroxyl groups and the membrane was further hydrolyzed in 2.5 N-NaOH/methanol solution (ratio of 1:1 by weight) at 65° C. for 15 hours.

A current efficiency of the cation exchange membrane under feeding the current by the process of Example 1 was 88% and an electric resistance of the membrane was 6.5 Ωcm².

EXAMPLE 3

A cation exchange membrane was prepared by reinforcing with polytetrafluoroethylene fabric and bonding two sheets of membranes of copolymers of tetrafluoroethylene and

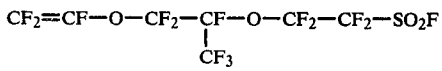

(EW=1100: thickness of 5 mil) and (EW=1500: thickness of 1 mil) and hydrolyzing the membrane and treating the membrane with a mixture of phosphorus oxychloride and phosphorus pentachloride (1:1 by weight) at 120° to 125° C. for 50 hours and washing the membrane with carbon tetrachloride and drying it vacuum to convert —SO₃H into —SO₂Cl.

The formation of —SO₂Cl was confirmed by the absorption at 1420 cm⁻¹ in the infrared spectrum.

In accordance with the process of Example 1, the treating mixture was impregnated into only one surface of the membrane (surface of EW=1500) and the polymerization and hydrolysis were performed to obtain a cation exchange membrane.

A current efficiency of the cation exchange membrane under feeding the current by the process of Example 1 was 91% and an electric resistance of the membrane was 7.8 Ωcm².

On the other hand, when a membrane treated with only ethylene-diamine was used, the current efficiency was 82% and the electric resistance of the membrane was 8.4 Ωcm².

EXAMPLE 4

The membrane of the fluorinated polymer having sulfonyl chloride groups used in Example 3 was used.

A treating mixture was prepared by reacting 1 mole of tetraethtlenepentamine with 1 mole of p-iodomethylstyrene in the presence of trimethylamine to obtain a reaction product and admixing 10 wt. parts of the reaction product with 5 wt.parts of acrylic acid, 3wt.parts of divinyl benzene and 0.05 wt. parts of benzoyl peroxide.

The treating mixture was impregnated into only one surface of the membrane (surface of EW=1500) at the room temperature for 5 hours and it was held between a pair of glass plates and the polyerization was performed at 95° C. for 15 hours.

A current efficiency of the cation exchange membrane under feeding the current by the process of Example 1 was 92% and an electric resistance of the membrane was 8.7 Ωcm².

On the other hand, when a membrane treated only tetraethylenepentamine was used, the current efficiency was 84% and the electric resistance of the membrane was 9.2 Ωcm².

EXAMPLE 5

In accordance with the process of Example 4 except performing the polymerization by a radiation of γ-ray at a rate of 10⁶ rad/hr for 15 hours at 20° C., a cation exchange membrane was prepared.

A current efficiency of the cation exchange membrane under feeding the current by the process of Example 1 was 91% and an electric resistance of the membrane was 8.9 Ωcm².

EXAMPLE 6

In accordance with the process of Example 4 except using CH₂=CH—CH=CH—COOH instead of acrylic acid, the impregnation, the reaction, the polymerization and the hydrolysis were performed to obtain a cation exchange membrane.

A current efficiency of the cation exchange membrane under feeding the current by the process of Example 1 was 93% and an electric resistance of the membrane was 9.5 Ωcm².

EXAMPLE 7

In accordance with the process of Example 1 except using CF₂=CF—COOCH₃ instead of acrylic acid, the impregnation, the reaction, the polymerization and the hydrolysis were performed the obtain a cation exchange membrane.

A current efficiency of the cation exchange membrane under feeding the current by the process of Example 1 was 89% and an electric resistance of the membrane was 6.2 Ωcm².

What is claimed is:

1. A process for producing a cation exchange membrane which comprises treating a membrane of a fluorinated polymer having sulfonyl halide groups on side chains, with a mixture of ① a reaction product of an amine with a halogenated monomer and ② a vinyl monomer and/or a diene monomer each of which has carboxylic acid group, phenolic hydroxyl group, sulfonic acid group and/or a functional group being convertible into carboxylic acid group, phenolic hydroxyl group or sulfonic acid group by impregnating or coating the mixture on the membrane and reacting the amino group of the reaction product with the sulfonyl halide group of the membrane and performing a polymerization and converting the functional groups into carboxylic acid groups, phenolic hydroxyl groups and/or sulfonic acid groups in the case of the functional groups.

2. A process for producing a cation exchange membrane according to claim 1 wherein the mixture further comprises a crosslinking agent, a radical indicator or a sensitizer.

3. A process for producing a cation exchange membrane according to claim 1 or 2 wherein the membrane having sulfonyl halide groups is a membrane of a copolymer of a fluorinated monomer and a monomer having the formula

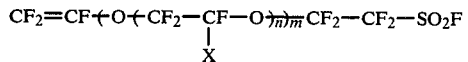

wherein X represents —F, —CF₃ or —CF₂—O—CF₃; n represents 0 or 5; m represents 0 or 1 or a membrane obtained by converting —SO₂F of the membrane to —$SO_3M$ wherein M is hydrogen or an alkali metal and further converting it to —$SO_2Cl$.

4. A process for producing a cation exchange membrane according to claim 1 wherein the amine is a monoamine, a diamine and/or a polyamine.

5. A process for producing a cation exchange membrane according to claim 1 wherein the amine has at least one of a primary amine group.

6. A process for producing a cation exchange membrane according to claim 1 wherein the reaction product of the amine with the halogenated monomer has at least one primary amino group or secondary amino group.

7. A process for producing a cation exchange membrane according to claim 1 wherein the polymerization is carried out by a thermal polymerization, a photopolymerization, a radical polymerization or a high energy radiation-induced polymerization.

* * * * *